(12) United States Patent
Bitoh (10) Patent No.: US 7,820,331 B2
(45) Date of Patent: Oct. 26, 2010

(54) FUEL CELL AND FUEL CELL SYSTEM

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1233 days.

(21) Appl. No.: 11/214,164

(22) Filed: Aug. 29, 2005

(65) Prior Publication Data

US 2006/0046115 A1 Mar. 2, 2006

(30) Foreign Application Priority Data

Aug. 30, 2004 (JP) ............................. 2004-250488

(51) Int. Cl.
*H01M 8/00* (2006.01)

(52) U.S. Cl. .................. 429/400; 429/443; 429/456; 429/428

(58) Field of Classification Search ............... 429/34, 429/428, 400, 456, 443
See application file for complete search history.

(56) References Cited

U.S. PATENT DOCUMENTS

2004/0053091 A1* 3/2004 Yokoi ........................ 429/22

FOREIGN PATENT DOCUMENTS

| JP | 63-291364 A | 11/1988 | |
|----|-------------|---------|---|
| JP | 63276878 A | * | 11/1988 |
| JP | 05-248356 A | 9/1993 | |
| JP | 07-201348 A | 8/1995 | |
| JP | 07-230817 A | 8/1995 | |
| JP | 09-055216 A | 2/1997 | |
| JP | 11-204128 A | 7/1999 | |
| JP | 11-270712 A | 10/1999 | |
| JP | 2000-243421 A | 9/2000 | |
| JP | 2002-093443 A | 3/2002 | |
| JP | 2002-195435 A | 7/2002 | |
| JP | 2003-031241 A | 1/2003 | |

OTHER PUBLICATIONS

Japanese Office Action (and English translation thereof) dated Feb. 19, 2008, issued in a counterpart Japanese Application.
Japanese Office Action dated Aug. 4, 2009 and English translation thereof issued in a counterpart Japanese Application No. 2004-250488.

* cited by examiner

*Primary Examiner*—Jane Rhee
(74) *Attorney, Agent, or Firm*—Holtz, Holtz, Goodman & Chick, PC (57) ABSTRACT

Provided is a fuel cell including an electrolyte membrane, a first separator in which a fuel path through which a fuel flows is formed so as to face one surface of the electrolyte membrane and which has thereinside a fuel supply amount adjuster for adjusting the supply amount of the fuel, and a second separator in which an oxidizer path through which an oxidizer flows is formed so as to face the other surface of the electrolyte membrane.

14 Claims, 8 Drawing Sheets

FUEL CELL AND FUEL CELL SYSTEM

BACKGROUND OF THE INVENTION

1. Field of the Invention

The present invention relates to a fuel cell for controlling a fluid necessary for power generation, and a fuel cell system having a plurality of fuel cells.

2. Description of the Related Art

Recently, a fuel cell which generates power by reacting a fuel such as hydrogen with an oxidizer such as oxygen has been utilized as a clean power source having a high energy conversion efficiency.

Such a fuel cell has conventionally had a structure in which a membrane electrode assembly (MEA) for reacting a fuel with an oxidizer is sandwiched between separators for separating the fuel from the oxidizer and individually supplying these to the membrane electrode assembly. There is also known a fuel cell in which a plurality of cell stacks in each of which a plurality of fuel cells each having this sandwiched structure are stacked are connected to each other, as disclosed in Unexamined Japanese Patent Application KOKAI Publication No. 2000-243421.

A fuel cell in which a plurality of such cell stacks are connected is provided with valves for adjusting the amount of fuel and the amount of gas as the oxidizer both respectively supplied to each cell stack, in order to improve the power generation efficiency of the whole fuel cell. The fuel cell controls the opening or closing degree of each valve based on the output voltage of each cell stack and the air pressure applied to each cell stack, thereby adjusting unevenness of the power generated by each cell stack.

However, such a fuel cell apparatus has a problem that the fuel cells in each cell stack cannot be supplied with air of a well-balanced amount, because only one valve provided externally per cell stack collectively supplies air to the plurality of fuel cells in the cell stack. Furthermore, a voltage sensor senses the voltage per cell stack but cannot determine whether unevenness is caused in the voltages of the respective fuel cells in the cell stack, and this makes it harder to control the plurality of fuel cells in the cell stack with a fine balance.

Unless the fuel and oxidizer are uniformly supplied to the respective fuel cells, there arises a problem that the fuel cells will have different power generation performances, and the power generation efficiency of the whole cell stack degenerates as influenced by a smaller power.

In addition, the fuel cell easily loses an equilibrium suitable for the fuel and the oxidizer to react with each other, when the supply amounts of the fuel and oxidizer to be supplied to each cell only minutely increase or decrease. Therefore, there occurs a problem that the power generation efficiency greatly drops, if the supply amounts of the fuel and oxidizer to be supplied to each cell are not adjusted.

SUMMARY OF THE INVENTION

An advantage of the present invention is to provide a fuel cell that can prevent a drop of power generation efficiency by adjusting the supply amounts of fuel and oxidizer to be supplied to each fuel cell on a cell-by-cell basis.

To solve the above-described problems, a fuel cell according to the present invention comprises:

an electrolyte membrane;

a first separator in which a fuel path through which a fuel flows is formed so as to face one surface of the electrolyte membrane, the first separator comprising a fuel supply amount adjuster thereinside which adjusts a supply amount of the fuel; and a second separator in which an oxidizer path through which an oxidizer flows is formed so as to face the other surface of the electrolyte membrane.

Another fuel cell according to the present invention comprises:

an electrolyte membrane;

a first separator in which a fuel path through which a fuel flows is formed so as to face one surface of the electrolyte membrane; and a second separator in which an oxidizer path through which an oxidizer flows is formed so as to face the other surface of the electrolyte membrane, the second separator comprising thereinside an oxidizer supply amount adjuster which adjusts a supply amount of the oxidizer.

According to these inventions, the fuel supply amount adjuster or the oxidizer supply amount adjuster can appropriately adjust the supply amount of the fuel or oxidizer. Therefore, if a plurality of this fuel cell are provided, the fuel supply amount or the oxidizer supply amount in each of the plurality of fuel cells can be adjusted with a fine balance.

Yet another fuel cell according to the present invention comprises:

an electrolyte membrane;

a first separator in which a fuel path through which a fuel flows is formed so as to face one surface of the electrolyte membrane, the first separator comprising thereinside a fuel flow rate detector which detects a flow rate of the fuel; and a second separator in which an oxidizer path through which an oxidizer flows is formed so as to face the other surface of the electrolyte membrane.

Still another fuel cell according to the present invention comprises:

an electrolyte membrane;

a first separator in which a fuel path through which a fuel flows is formed so as to face one surface of the electrolyte membrane; and a second separator in which an oxidizer path through which an oxidizer flows is formed so as to face the other end of the electrolyte membrane, the second separator comprising thereinside an oxidizer flow rate detector which detects a flow rate of the oxidizer.

According to these inventions, the fuel flow rate detector or the oxidizer flow rate detector can appropriately detect the flow rate of the fuel or oxidizer. Therefore, if a plurality of this fuel cell are provided, it is possible to determine whether the fuel supply amount or the oxidizer supply amount in each fuel cell is appropriate by detecting the flow rate of the fuel or oxidizer in each fuel cell.

BRIEF DESCRIPTION OF THE DRAWINGS

These objects and other objects and advantages of the present invention will become more apparent upon reading of the following detailed description and the accompanying drawings in which:

FIGS. 5 are cross sectional diagrams as sectioned along the V-V plane of FIG. 3, where

DETAILED DESCRIPTION OF THE PREFERRED EMBODIMENT

The best embodiment for carrying out the present invention will now be explained with reference to FIG. 1 to FIG. 8. However, note that the scope of the present invention is not limited to the example illustrated in the drawings.

Figure 1:
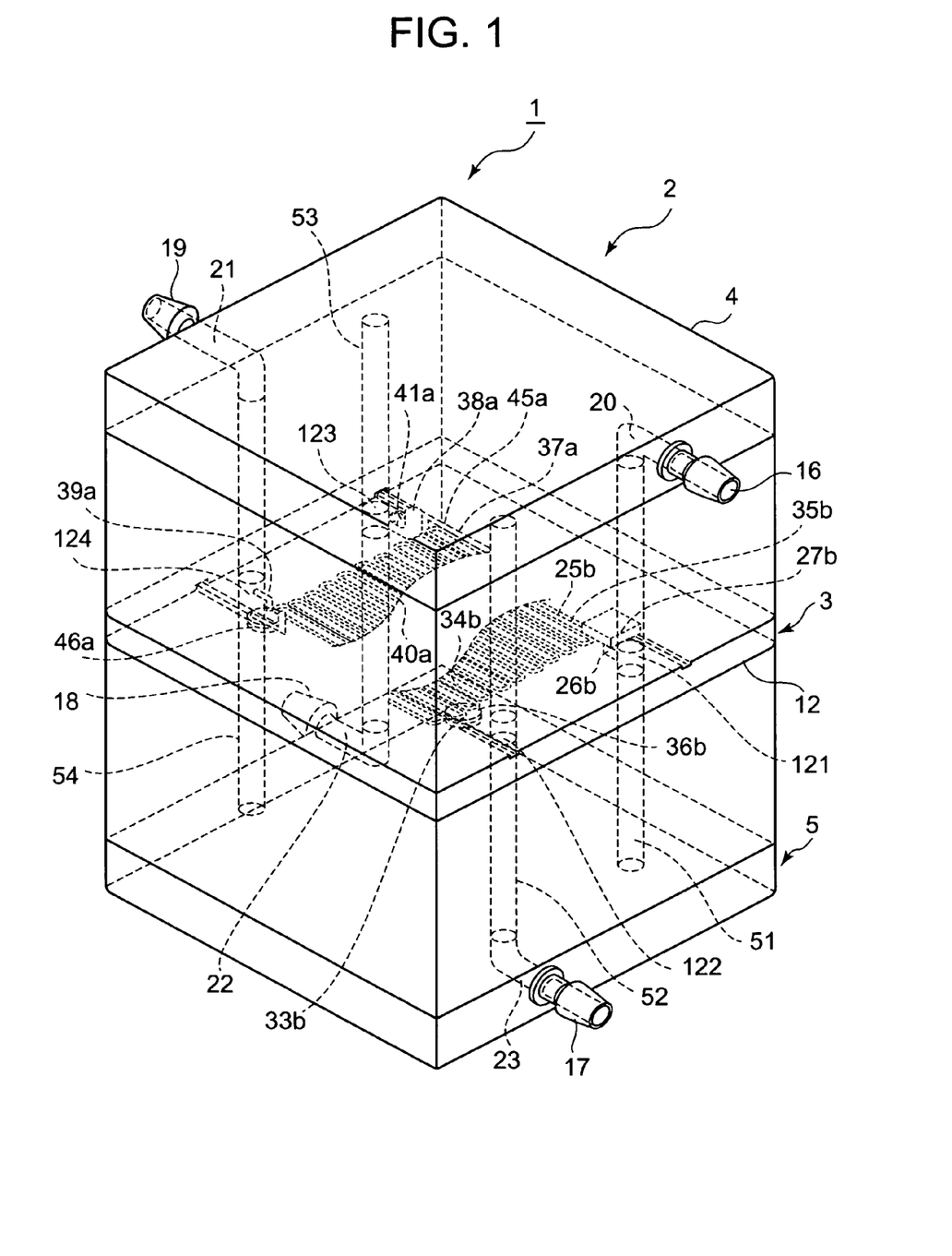
FIG. 1 is a perspective diagram showing the configuration of one embodiment of the fuel cell according to the present invention.
Figure 2:
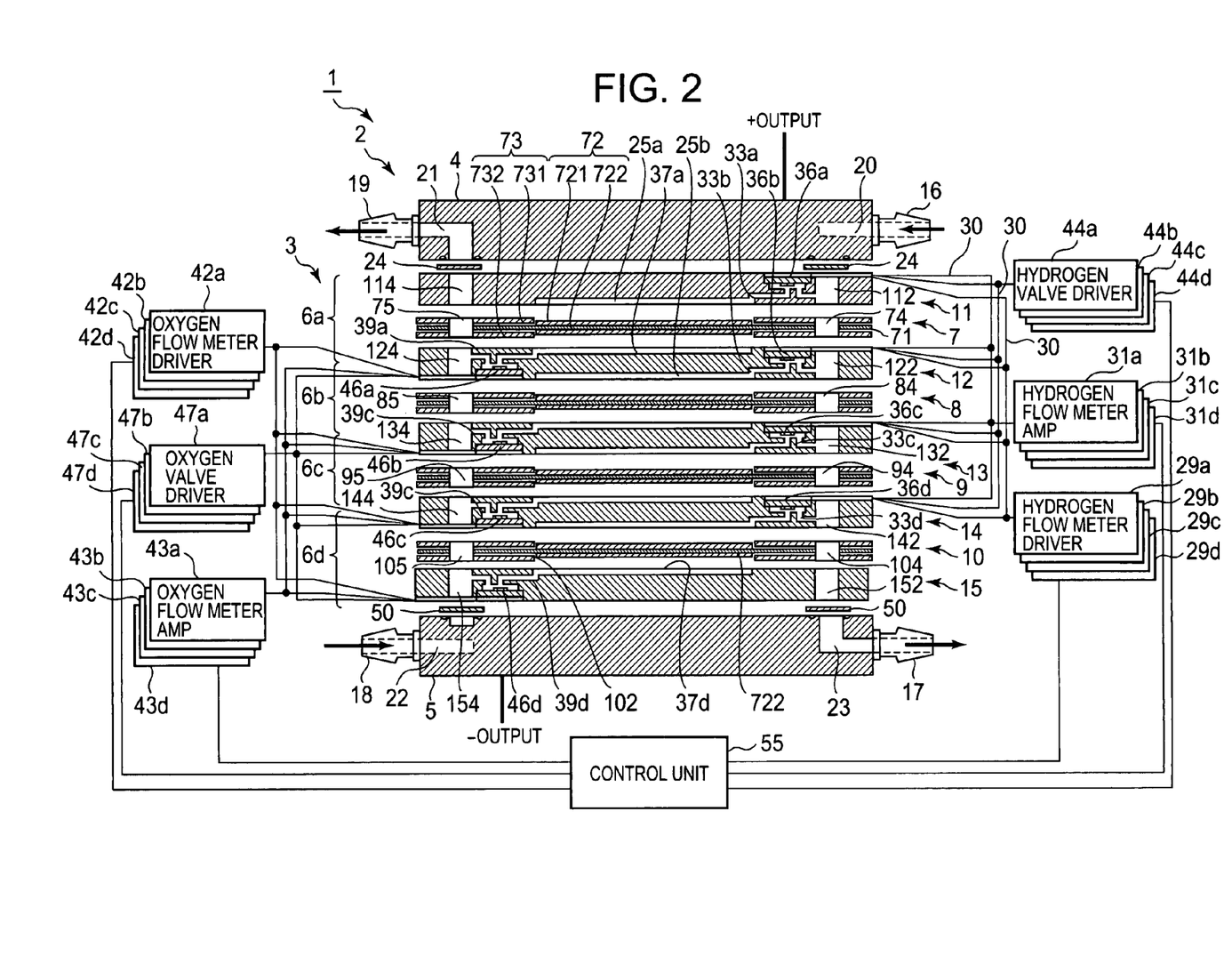
FIG. 2 is an explanatory diagram showing the configuration of the fuel cell according to the embodiment.

FIG. 1 is a perspective view of a fuel cell 1 according to the present embodiment. FIG. 2 is a diagram for explaining the configuration of the fuel cell 1. As shown in FIG. 1 and FIG. 2, the fuel cell 1 has a cell stack unit 2 for power generation. The cell stack unit 2 comprises a cell stack 3 in which cells 6a, 6b, 6c, and 6d (see FIG. 2) as the smallest power generating units are stacked. The cell stack 3 are sandwiched between a first power collection board 1 and a second power collection board 5 both for collecting power generated by the cell stack 3.

The cells 6a, 6b, 6c, and 6d have a sandwiched structure where membrane electrode assemblies (MEAs) 7, 8, 9, and 10 having the same structure and reacting, for example, hydrogen as the fuel with, for example, oxygen as the oxidizer are respectively sandwiched between adjacent two of separators 11, 12, 13, 14, and 15 for supplying hydrogen and oxygen to the membrane electrode assemblies 7, 8, 9, and 10. Note that the separators 12, 13, and 14 have the same structure.

The power collection boards 4 and 5 are formed of a good conductor such as gold-plated copper or the like, and have a rectangular shape as seen from above. The power collection boards 4 and 5 are each provided, on their external surface, with an end plate (not shown) formed of, for example, ceramic, plastic, glass, silicon, or the like, via an insulating plate formed of an insulating material.

A hydrogen entry port 16 from which a fluid containing hydrogen is let in is formed on one side surface of the first power collection board 4, and a fluid exit port 17 from which the fluid let in from the hydrogen entry port 16 is let out is formed on one side surface of the second power collection board 5. An oxygen entry port 18 from which the oxidizer is let in is formed on the other side surface of the second power collection board 5, and a fluid exit port 19 from which a fluid containing the reaction product water produced from reaction of hydrogen and oxygen is let out is formed on the other side surface of the first power collection board 4.

A hydrogen supply opening 20 (see FIG. 1) is formed in one end portion of the first power collection board 4 so as to couple the hydrogen entry port 16 to the surface of board 4 facing the cell stack 3 in order to circulate hydrogen, while a fluid discharge opening 21 is formed in the other end portion so as to couple the surface of the board 4 facing the cell stack 3 to the fluid exit port 19 in order to circulate a fluid containing reaction product water. An oxygen supply opening 22 (see FIG. 1) is formed in one end portion of the second power collection board 5 so as to couple the oxygen entry port 18 to the surface of the board 5 facing the cell stack 3 in order to circulate oxygen, while a fluid discharge opening 23 is formed in the other end portion so as to couple the surface of the board 5 facing the cell stack 3 to the fluid exit port 17 in order to discharge a fluid containing hydrogen flowing out from any of later-described hydrogen circulating sections 34a to 34d of the cells 6a to 6d.

Figure 3:
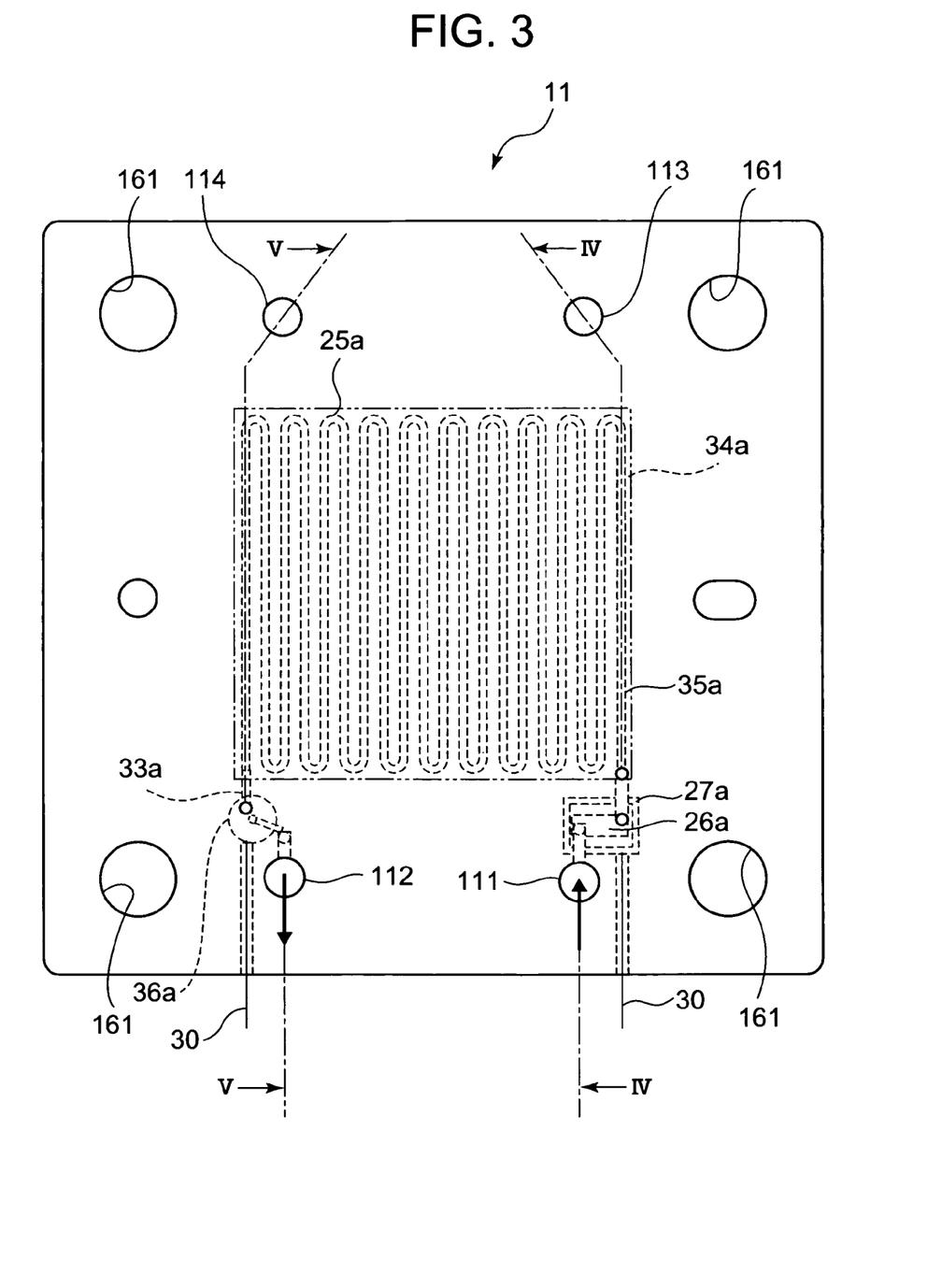
FIG. 3 is a plan view of a hydrogen separator constituting the fuel cell according to the embodiment.

A hydrogen separator 11 for supplying hydrogen into the cell 6a is disposed on the surface of the first power collection board 4 facing the cell stack 3 via an O-ring 24. The hydrogen separator 11 is formed of a material inactive against hydrogen, for example, ceramic, plastic, glass, or silicon, or a composite material of these, and has a rectangular shape as seen from above. FIG. 3 is a plan view of the hydrogen separator 11, FIG. 4 is a cross sectional view as sectioned along the IV-IV plane of FIG. 3, and FIGS. 5 are cross sectional views as sectioned along the V-V plane of FIG. 3.

Figure 4:
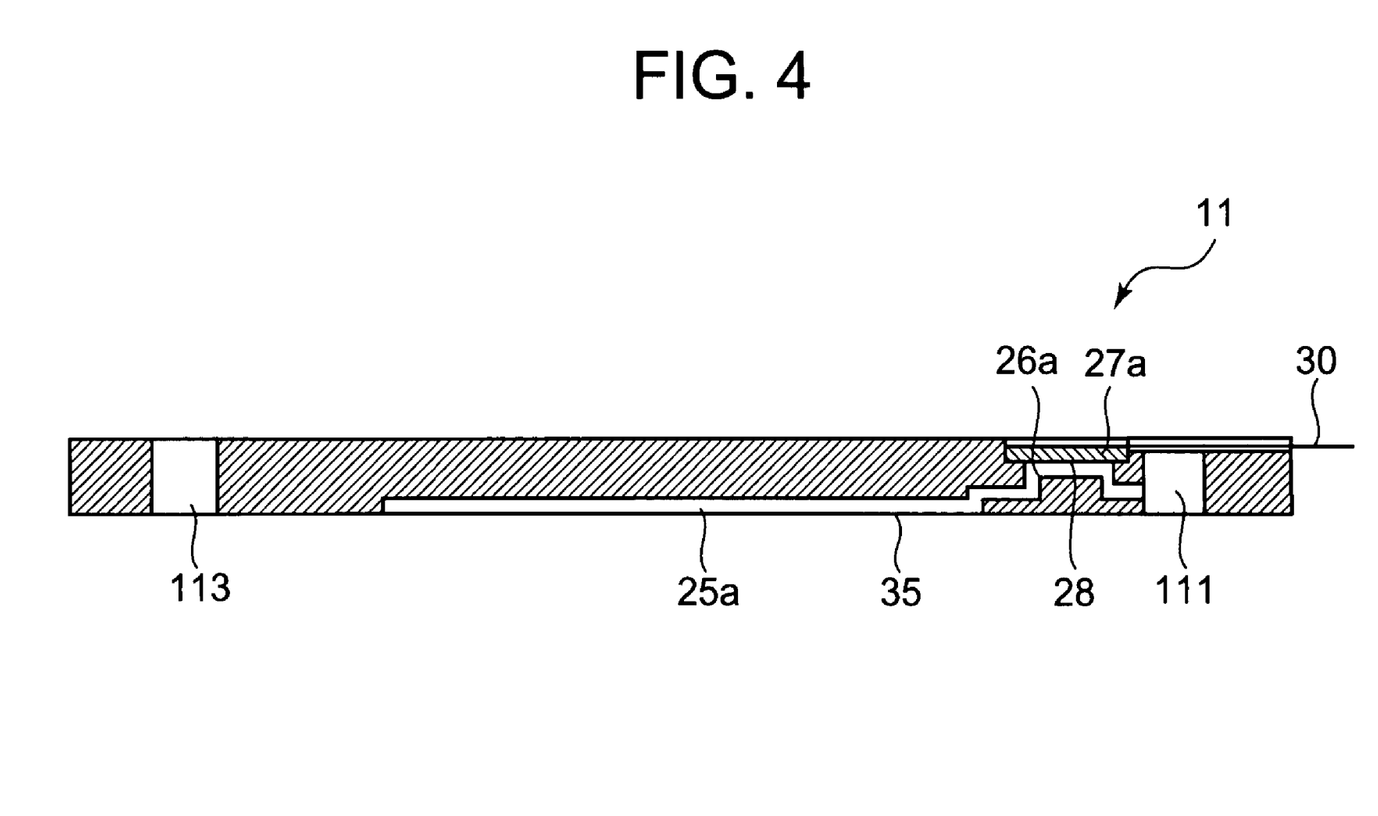
FIG. 4 is a cross sectional diagram as sectioned along the IV-IV plane of FIG. 3.

As shown in FIG. 3 to FIGS. 5, formed in one end portion of the hydrogen separator 11 are a hydrogen supply opening 111 penetrating through the joint surface of the separator 11 jointed to the first power collection board 4 and through the surface thereof opposite to the joint surface in order to circulate hydrogen, and a fluid discharge opening 112 for circulating a fluid flowing out from the hydrogen circulating section 34a. Also formed in the other end portion of the hydrogen separator 11 are an oxygen supply opening 113 penetrating through the joint surface of the separator 11 jointed to the first power collection board 4 and through the surface opposite to the joint surface in order to circulate oxygen, and a fluid discharge opening 114 for circulating a fluid containing reaction product water.

Further, a hydrogen conduit 25a is formed in a switchback shape as shown in FIG. 3, in the center of the surface of the hydrogen separator 11 opposite to the surface thereof jointed to the first power collection board 4. A hydrogen supply relay unit 26a for circulating hydrogen from the hydrogen supply opening 111 into the hydrogen conduit 25a is formed between one end of the hydrogen conduit 25a and the hydrogen supply opening 111.

As shown in FIG. 3 and FIG. 4, a hydrogen flow rate sensor 27a as a flow rate detector for detecting the flow rate of hydrogen per unit time is embedded in the midst of the hydrogen supply relay unit 26a disposed in the hydrogen separator 11. The hydrogen flow rate sensor 27a is embedded so as to be exposed inside the hydrogen supply relay unit 26a, in a manner that a measuring section 28 formed in the hydrogen flow rate sensor 27a can contact the hydrogen circulating through the hydrogen supply relay unit 26a and measure the hydrogen flow rate per unit time.

The hydrogen flow rate sensor 27a comprises, for example, a silicon substrate (not shown), in which a cavity (not shown) is formed by an MEMS (Micro Electro Mechanical Systems) technique. The cavity is provided with a thin film (not shown). The thin film is equipped with a heater (not shown). The heater has on its both sides, an upstream thermoelectric couple (not shown) arranged at the upstream of the gas circulating direction, and a downstream thermoelectric couple (not shown) arranged at the downstream of the gas circulating direction. The measuring section 28 is built up of these heater and thermoelectric couple.

A hydrogen flow meter driver 29a (shown in FIG. 2) is connected to the hydrogen flow rate sensor 27a by a conductive wire 30, and a hydrogen flow meter amp 31a is also connected thereto. The hydrogen flow meter driver 29a functions as a detector driver for driving the hydrogen flow rate sensor 27a to activate the heater once in every predetermined period and thereby to obtain the temperature difference between the upstream and downstream thermoelectric couple caused by gas circulation in the form of a difference in the electromotive force. The hydrogen flow meter amp 31*a* amplifies the output signal as the electromotive force difference obtained from the hydrogen flow meter driver 29*a*. The fluid flowing through the hydrogen flow rate sensor 27*a* may not necessarily be hydrogen only. However, at least, the hydrogen concentration in the fluid supplied is constant all the time. Therefore, the measuring section 28 can measure a pure hydrogen flow rate based on a hydrogen concentration known beforehand.

On the other hand, formed between the other end of the hydrogen conduit 25*a* and the fluid discharge opening 112 in the hydrogen separator 11, is a hydrogen small chamber 32*a* for adjusting the supply amount of hydrogen supplied in the cell 6*a*. Also formed between the other end of the hydrogen conduit 25*a* and the fluid discharge opening 112 is a fluid discharge relay unit 33*a* which circulates a fluid flowing out from the hydrogen circulating section 34*a* while going through the hydrogen conduit 25*a* toward the fluid discharge opening 112 via the hydrogen small chamber 32*a*.

By the hydrogen separator 11 being jointed to a later-described first membrane electrode assembly 7, the hydrogen conduit 25*a* constitutes the hydrogen circulating section 34*a* in which hydrogen can circulate. The hydrogen circulating section 34*a*, the hydrogen supply relay unit 26*a*, and the fluid discharge relay unit 33*a* constitute a hydrogen path 35*a* for circulating a fluid containing hydrogen supplied from the hydrogen supply opening 111 in the cell 6*a* and then discharging the fluid from the fluid discharge opening 112.

A hydrogen valve 36*a* as a supply amount adjuster for adjusting the supply amount of hydrogen to be supplied in the cell 6*a* is accommodated in the hydrogen small chamber 32*a*, and an opening/closing member 362 constituting the hydrogen valve 36*a* is formed so as to be able to come into and out of contact with the entry into the hydrogen small chamber 32*a* from the fluid discharge relay unit 33*a*.

The hydrogen valve 36*a* comprises, for example, a piezoelectric element 361 whose circumference is fixed on the wall of the hydrogen small chamber 32*a*. The opening/closing member 362 made of elastic gum and capable of opening or closing the entry into the hydrogen small chamber 32*a* from the fluid discharge relay unit 33*a*, is disposed at a location on the piezoelectric element 361 corresponding to the entry into the hydrogen small chamber 32*a*.

A hydrogen valve driver 44*a* (shown in FIG. 2) as an adjuster driver for driving the hydrogen valve 36*a* to apply a predetermined voltage to the piezoelectric element 361 is connected to the hydrogen valve 36*a* by a conductive wire 30. The piezoelectric element 361 constituting the hydrogen valve 36*a* becomes curved in accordance with the applied voltage to cause the opening/closing member 362 to come into or out of contact with the entry. Due to this, the opening or closing degree of the entry into the hydrogen small chamber 32*a* from the fluid discharge relay unit 33*a* is changed, making it possible to adjust the amount of hydrogen to be drawn out from the hydrogen circulating section 34*a* to the fluid discharge opening 112 via the fluid discharge relay unit 33*a*. In other words, the flow rate of hydrogen supplied in the cell 6*a* per unit time can be adjusted.

Figure 5A:
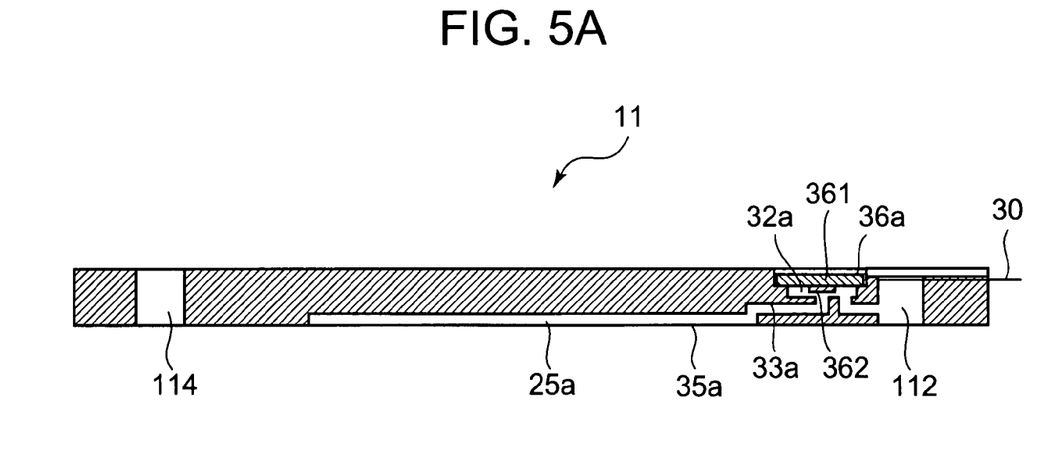
FIG. 5A shows a state where a hydrogen valve is opened and FIG. 5B shows a state where the hydrogen valve is closed.
Figure 5B:
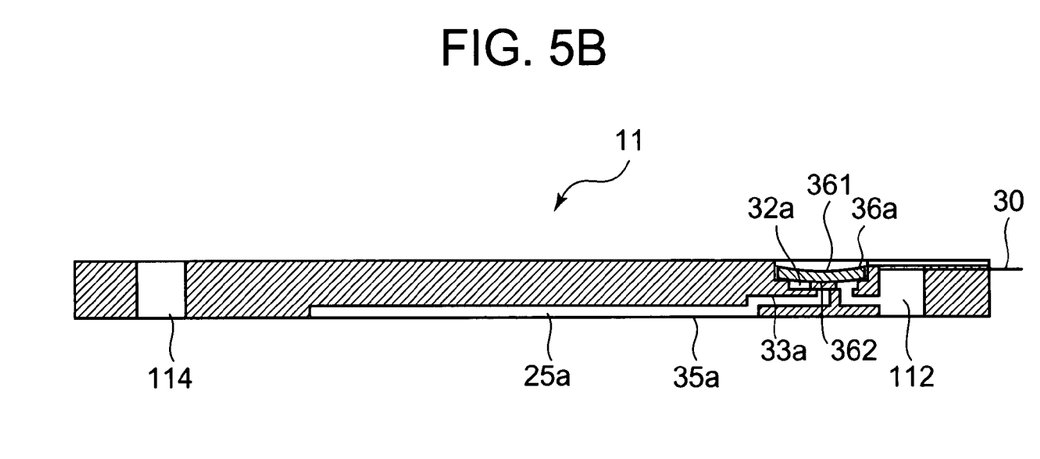

Specifically, when the opening/closing member 362 opens the entry as shown in FIG. 5A, the difference between the pressure in the hydrogen circulating section 34*a* and the pressure in the fluid discharge opening 112 causes the hydrogen in the fluid state residing in the higher-pressured hydrogen circulating section 34*a* to move toward the lower-pressured fluid discharge opening 112, and this invites continuous influx of hydrogen into the cell 6*a* from the hydrogen entry port 16. When the opening/closing member 362 of the cell 6*a* closes the entry as shown in FIG. 5B, the hydrogen circulating section 34*a* of the cell 6*a* cannot be depressurized, and the hydrogen taken in from the hydrogen entry port 16 therefore flows toward any of the hydrogen circulating section 34*b* to 34*d* of the cells 6*b* to 6*d*, that is lower-pressured than the hydrogen circulating section 34*a* of the cell 6*a* because the opening/closing member 362 does not close the entry. As a result, the supply of hydrogen into the cell 6*a* can be stopped.

A conductive thin film (not shown) made of gold or the like is formed on the surface of the hydrogen separator 11 that is opposite to the surface thereof jointed to the first power collection board 4, and on a part of the side surfaces of the hydrogen separator 11.

As shown in FIG. 2, a first membrane electrode assembly 7 is formed on the surface of the hydrogen separator 11 opposite to the surface thereof jointed to the first power collection board 4. The first membrane electrode assembly 7 has a rectangular shape similar to the hydrogen separator 11 as seen from above. The first membrane electrode assembly 7 comprises a solid polyelectrolyte membrane 71 which selectively allows protons to permeate therethrough. An electrode pair 72 comprising an anode (hydrogen pole) 721 and a cathode (oxygen pole) 722 is formed at the center of the solid polyelectrolyte membrane 71 corresponding to the part of the hydrogen separator 11 where the hydrogen conduit 25*a* is formed, in a manner that the anode 721 and the cathode 722 are integrated with the solid polyelectrolyte membrane 71 so as to sandwich it from above and below. The first membrane electrode assembly 7 has its side of the anode 721 jointed to the hydrogen separator 11 via a gasket 731 which has a rectangular frame shape.

The solid polyelectrolyte membrane 71 is made of, for example, a perfluorosulfonic acid ion-exchange membrane. The anode 721 comprises a gas diffusion layer for diffusing hydrogen, and a catalytic layer supporting a catalyst for dissociating hydrogen into protons and electrons. The cathode 722 comprises a gas diffusion layer for diffusing oxygen and discharging reaction product water, and a catalytic layer supporting a catalyst for reacting protons and electrons of oxygen and hydrogen.

The catalytic layers are made by mixing, for example, a carbon-supported platinum catalyst, a polyelectrolyte, and a water-repellent agent, and the gas diffusion layers are made of, for example, carbon paper or carbon cloth excellent in gas diffusing property and electric conductivity.

Formed in one end portion of the solid polyelectrolyte membrane 71 and gasket 73 are a hydrogen supply opening 76 penetrating them from the joint surface of the first membrane electrode assembly 7 jointed to the hydrogen separator 11 to the surface thereof opposite to the joint surface in order to supply hydrogen into the cell 6*a*, and a fluid discharge opening 74 for discharging a fluid which is taken in from the hydrogen supply opening 76 and which partially flows through the solid polyelectrolyte membrane 71 in the form of protons. Formed in the other end portion of the solid polyelectrolyte membrane 71 and gasket 73 are an oxygen supply opening 77 penetrating them from the joint surface of the first membrane electrode assembly 7 jointed to the hydrogen separator 11 to the surface thereof opposite to the joint surface in order to supply oxygen into the cell 6*a*, and a fluid discharge opening 75 for discharging a fluid containing reaction product water.

A first double-face separator 12 for supplying oxygen and hydrogen by separating them from each other is disposed on the side of the cathode 722 of the first membrane electrode assembly 7, via the gasket 732 which has a rectangular frame shape. The first double-face separator 12 is formed of a material inactive against hydrogen and oxygen, such as ceramic, plastic, glass, silicon, etc., and has a rectangular shape as seen from above likewise the hydrogen separator 11.

As shown in FIG. 1 and FIG. 2, a hydrogen supply opening 121 and a fluid discharge opening 122 are formed in one end portion of the first double-face separator 12. The hydrogen supply opening 121 penetrates the separator 12 from the joint surface of the separator 12 jointed to the first membrane electrode assembly 7 to the surface thereof opposite to the joint surface, and is coupled to the hydrogen supply opening 111 of the hydrogen separator 11 to supply hydrogen to the solid polyelectrolyte membrane 81 of the cell 6b.

The fluid discharge opening 122 is formed so as to be coupled to the fluid discharge opening 112 of the hydrogen separator 11, and discharges a fluid flowing out from the hydrogen circulating section 34b of the cell 6b provided in the same manner as the hydrogen circulating section 34a. An oxygen supply opening 123 and a fluid discharge opening 124 are respectively formed in the other end portion of the first double-face separator 12. The oxygen supply opening 123 is formed so as to penetrate the separator 12 from the joint surface of the separator 12 jointed to the first membrane electrode assembly 7 to the surface thereof opposite to the joint surface, and is coupled to the oxygen supply opening 113 of the hydrogen separator 11 to supply oxygen into the cell 6a. The fluid discharge opening 124 is formed so as to be coupled to the fluid discharge opening 114 of the hydrogen separator 11, and discharges a fluid containing reaction product water produced in the cell 6a.

Figure 6:
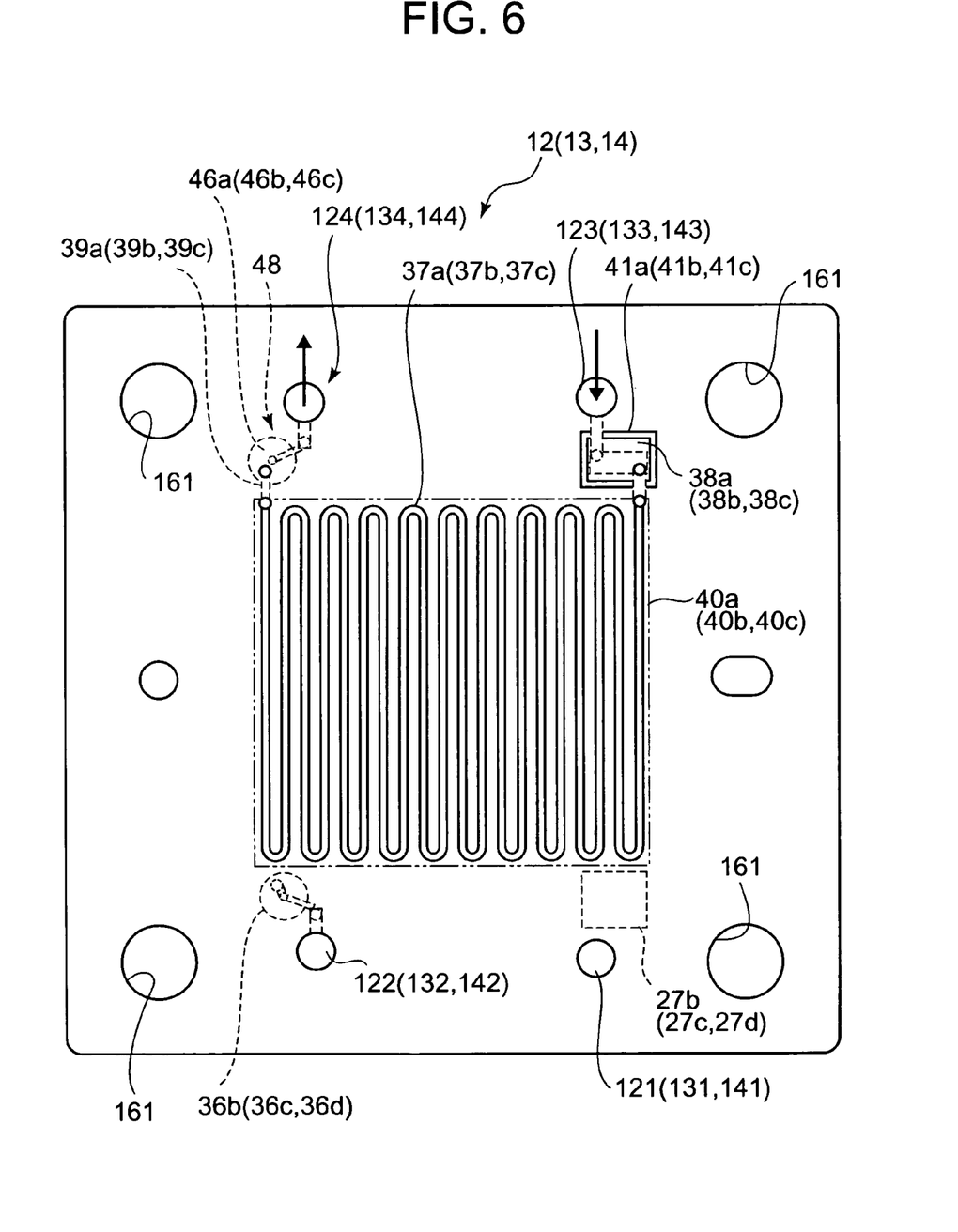
FIG. 6 is a plan view of a double-face separator constituting the fuel cell according to the embodiment.

FIG. 6 is a plan view of the double-face separator 12. As shown in FIG. 6, an oxygen conduit 37a is formed in a switchback shape in the center of the surface of the double-face separator 12 that is jointed to the first membrane electrode assembly 7. An oxygen supply relay unit 38a for circulating oxygen from the oxygen supply opening 123 into the oxygen conduit 37a is formed between one end of the oxygen conduit 37a and the oxygen supply opening 123.

An oxygen flow rate sensor 41a as a flow rate detector for detecting the flow rate of oxygen per unit time is embedded in the middle of the oxygen supply relay unit 38a formed in the first double-face separator 12. The oxygen flow rate sensor 41a is embedded in such a manner that a measuring section (not shown) formed in the oxygen flow rate sensor 41a for measuring the flow rate per unit time is exposed inside the oxygen supply relay unit 38a to be able to contact the oxygen circulating through the relay unit 38a. The oxygen flow rate sensor 41a has a similar structure to that of the above-described hydrogen flow rate sensor 27a, and an oxygen flow meter driver 42a as a detector driver and an oxygen flow meter amp 43a are connected to the oxygen flow rate sensor 41a, similarly to the above-described hydrogen flow rate sensor 27a. The fluid flowing through the oxygen flow rate sensor 41a may not necessarily be oxygen only, but the measuring section can measure a pure oxygen flow rate based on an oxygen concentration known beforehand, since at least the oxygen concentration in the supplied fluid is constant all the time.

On the other hand, an oxygen small chamber 48 for adjusting the supply amount of oxygen to be supplied into the cell 6a is formed between the other end of the oxygen conduit 37a of the first double-face separator 12 and the fluid discharge opening 124. A fluid discharge relay unit 39a for circulating a fluid containing oxygen and reaction product water from the oxygen conduit 37a via the oxygen small chamber 48 to the fluid discharge opening 124 is further formed between the other end of the oxygen conduit 37a and the fluid discharge opening 124.

By the surface of the double-face separator 12 on which the oxygen conduit 37a is formed being jointed to the first membrane electrode assembly 7, the oxygen conduit 37a functions as an oxygen circulating section 40a in which oxygen and reaction product water can circulate. The oxygen circulating section 40a, the oxygen supply relay unit 38a, and the fluid discharge relay unit 39a constitute an oxygen path 45a for circulating oxygen supplied from the oxygen supply opening 123 and reaction product water in the cell 6a and discharging them from the fluid discharge opening 124.

An oxygen valve 46a as a supply amount adjuster for adjusting the supply amount of oxygen to be supplied into the cell 6a is disposed in the oxygen small chamber 48. An opening/closing member constituting the oxygen valve 46a is disposed so as to be able to come into and out of contact with the entry into the oxygen small chamber 48 from the fluid discharge relay unit 39a. The oxygen valve 46a has a similar structure to that of the above-described hydrogen valve 36a, and an oxygen valve driver 47a as an adjuster driver is connected to the oxygen valve 46a, similarly.

A hydrogen conduit 25b having the same shape as that of the hydrogen conduit 25a of the hydrogen separator 11 is formed in the center of the surface of the first double-face separator 12, which surface is opposite to the surface in which the oxygen conduit 37a is formed. A hydrogen supply relay unit 26b for circulating hydrogen from the hydrogen supply opening 121 into the hydrogen conduit 25b is formed between one end of the hydrogen conduit 25b and the hydrogen supply opening 121, likewise the hydrogen supply relay unit 26a of the hydrogen separator 11. A hydrogen flow rate sensor 27b same as the hydrogen flow rate sensor 27a of the hydrogen separator 11 is disposed in the middle of the hydrogen supply relay unit 26b. A fluid discharge relay unit 33b for circulating the fluid flowing out from the oxygen conduit 25b toward the fluid discharge opening 122 is formed between the other end of the hydrogen conduit 25b and the fluid discharge opening 122, likewise the fluid discharge relay unit 33a of the hydrogen separator 11. A hydrogen valve 36b is disposed in the middle of the fluid discharge relay unit 33b, likewise the hydrogen valve 36a of the hydrogen separator 11.

A hydrogen flow meter amp 31b same as the hydrogen flow meter amp 31a, a hydrogen flow meter driver 29b same as the hydrogen flow meter driver 29a, and a hydrogen valve driver 44b same as the hydrogen valve driver 44a are provided for the first double-face separator 12.

A conductive thin film (not shown) made of gold or the like is formed on the surface of the first double-face separator 12 jointed to the first membrane electrode assembly 7, on the surface opposite to this joint surface, and on the side surfaces of the first double-face separator 12.

A second membrane electrode assembly 8 having the same structure as the first membrane electrode assembly 7 is disposed on the surface of the first double-face separator 12 opposite to the surface thereof jointed to the first membrane electrode assembly 7, in a manner that the anode (hydrogen pole) side of the assembly 8 is jointed to the first double-face separator 12.

A hydrogen supply opening 86 and a fluid discharge opening 84 are formed in one end portion of the solid polyelectrolyte membrane 81 and gasket 83 of the second membrane electrode assembly 8. The hydrogen supply opening 86 is formed so as to penetrate the second membrane electrode assembly 8 from the surface of the assembly 8 jointed to the first double-face separator 12 to the surface thereof opposite to this joint surface in order to supply hydrogen into the cell 6b. The fluid discharge opening 84 discharges a fluid which is taken in from the hydrogen supply opening 86 and which partially flows through the solid polyelectrolyte membrane 81 in the form of protons. An oxygen supply opening 87 penetrating the second membrane electrode assembly 8 from the surface of the assembly 8 jointed to the first double-face separator 12 to the surface thereof opposite to this joint surface in order to supply oxygen into the cell 6b, and a fluid discharge opening 85 for discharging a fluid containing reaction product water are formed in the other end portion of the membrane 81 and gasket 83.

A second double-face separator 13, a third membrane electrode assembly 9, a third double-face separator 14, and a fourth membrane electrode assembly 10, are disposed in this order on the cathode (oxygen pole) side of the second membrane electrode assembly 8 in a stacked manner. The third membrane electrode assembly 9 and the fourth membrane electrode assembly 10 have the same structure as the first membrane electrode assembly 7.

By the first double-face separator 12 being jointed to the second membrane electrode assembly 8, a hydrogen circulating section 34b in which hydrogen can circulate likewise the hydrogen circulating section 34a is formed, and this hydrogen circulating section 34b, the hydrogen supply relay unit 26b, and the fluid discharge relay unit 33b constitute a hydrogen path 35b for circulating a fluid containing hydrogen supplied from the hydrogen supply opening in the cell 6b and discharging the fluid from the fluid discharge opening 122.

The second double-face separator 13 and the third double-face separator 14 have the same structure as the first double-face separator 12. Therefore, the reference numerals of elements of the second double-face separator 13 that correspond to the elements of the first double-face separator 12 are parenthesized in FIG. 6. Likewise, the reference numerals of elements of the third double-face separator 14 that correspond to the elements of the first double-face separator 12 are parenthesized in FIG. 6.

The second double-face separator 13 and the third double-face separator 14 are provided with oxygen flow rate sensors 41b and 41c same as the oxygen flow rate sensor 41a of the first double-face separator 12, oxygen valves 46b and 46c same as the oxygen valve 46a, hydrogen flow rate sensors 27c and 27d same as the hydrogen flow rate sensor 27a, and hydrogen valves 36c and 36d same as the hydrogen valve 36b. Oxygen flow meter-amps 43b and 43c same as the oxygen flow meter amp 43a, oxygen flow meter drivers 42b and 42c same as the oxygen flow meter driver 42a, oxygen valve drivers 47b and 47c same as the oxygen valve driver 47a, hydrogen flow meter amps 31c and 31d same as the hydrogen flow meter amp 31b, hydrogen flow meter drivers 29c and 29d same as the hydrogen flow meter driver 29b, and hydrogen valve drivers 44c and 44d same as the hydrogen valve driver 44b are respectively connected to these sensors and valves by conductive wires 30.

By the second membrane electrode assembly 8 being jointed to the second double-face separator 13, an oxygen circulating section 40b in which oxygen and reaction product water can circulate is formed likewise the oxygen circulating section 40a. The oxygen circulating section 40b, an oxygen supply relay unit 38b same as the oxygen supply relay unit 38a, and a fluid discharge relay unit 39b constitute an oxygen path 45b likewise the oxygen path 45a. The oxygen path 45b circulates oxygen supplied from an oxygen supply opening 133 coupled to the oxygen entry port 18 and reaction product water in the cell 6b, and discharges them from a fluid discharge opening 134.

A hydrogen supply opening 96 penetrating the third membrane electrode assembly 9 from the surface of the assembly 9 jointed to the second double-face separator 13 to the surface thereof opposite to this joint surface in order to supply hydrogen into the cell 6c, and a fluid discharge opening 94 for discharging a fluid which is taken in from the hydrogen supply opening 96 and which partially flows through the solid polyelectrolyte membrane 91 in the form of protons are formed in one end portion of a solid polyelectrolyte membrane 91 and gasket 93 of the third membrane electrode assembly 9. An oxygen supply opening 97 penetrating the third membrane electrode assembly 9 from the surface of the assembly 9 jointed to the second double-face separator 13 to the surface thereof opposite to the joint surface in order to supply oxygen into the cell 6c, and a fluid discharge opening 95 for discharging a fluid containing reaction product water are formed in the other end portion of the solid polyelectrolyte membrane 91 and gasket 93.

By the second double-face separator 13 being jointed to the third membrane electrode assembly 9, a hydrogen circulating section 34c in which hydrogen can circulate is formed likewise the hydrogen circulating section 34b. The hydrogen circulating section 34c, a hydrogen supply relay unit 26c same as the hydrogen supply relay unit 26b, and a fluid discharge relay unit 33c same as the fluid discharge relay unit 33b constitute a hydrogen path 35c. The hydrogen path 35c circulates a fluid containing hydrogen supplied from a hydrogen supply opening 131 in the cell 6c and discharges the fluid from a fluid discharge opening 132.

The hydrogen supply opening 131 and the fluid discharge opening 132 are formed in one end portion of the second double-face separator 13. The hydrogen supply opening 131 is formed so as to penetrate the second double-face separator 13 from the surface of the separator 13 jointed to the second membrane electrode assembly 8 to the surface thereof jointed to the third membrane electrode assembly 9, and to be coupled to the hydrogen supply opening 121 of the first double-face separator 12 in order to supply hydrogen to the solid polyelectrolyte membrane 91 in the cell 6c. The fluid discharge opening 132 is formed so as to be coupled to the fluid discharge opening 122 of the first double-face separator 12, and discharges a fluid flowing out from the hydrogen circulating section 34c in the cell 6c which is formed likewise the fluid circulating section 34a. An oxygen supply opening 133 and a fluid discharge opening 134 are formed in the other end portion of the second double-face separator 13. The oxygen supply opening 133 is formed so as to penetrate the second double-face separator 13 from the surface of the separator 13 jointed to the second membrane electrode assembly 8 to the surface thereof jointed to the third membrane electrode assembly 9, and to be coupled to the oxygen supply opening 123 of the first double-face separator 12 to supply oxygen into the cell 6b. The fluid discharge opening 134 is formed so as to be coupled to the fluid discharge opening 124 of the first double-face separator 12, and discharges a fluid containing reaction product water produced in the cell 6b.

By the third membrane electrode assembly 9 being jointed to the third double-face separator 14, an oxygen circulating section 40c in which oxygen and reaction product water can circulate is formed. The oxygen circulating section 40c, an oxygen supply relay unit 38c same as the oxygen supply relay unit 38a, and an oxygen discharge relay unit 39c same as the oxygen discharge relay unit 39a constitute an oxygen path 45c. The path 45c circulates oxygen supplied from an oxygen supply opening 143 and reaction product water in the cell 6c, and discharges the fluid from a fluid discharge opening 144.

A hydrogen supply opening 141 and a fluid discharge opening 142 are formed in one end portion of the third double-face separator 14. The hydrogen supply opening 141 is formed so as to penetrate the third double-face separator 14 from the surface of the separator 14 jointed to the third membrane electrode assembly 9 to the surface thereof jointed to the fourth membrane electrode assembly 10, and to be coupled to the hydrogen supply opening 131 of the second double-face separator 13 in order to supply hydrogen to the solid polyelectrolyte membrane 101 in the cell 6d. The fluid discharge opening 142 is coupled to the fluid discharge opening 132 of the second double-face separator 13, and discharges a fluid flowing out from a hydrogen circulating section 34d provided likewise the hydrogen circulating section 34a. An oxygen supply opening 143 and a fluid discharge opening 144 are formed in the other end portion of the third double-face separator 14. The oxygen supply opening 143 penetrates the third double-face separator 14 from the surface of the separator 14 jointed to the third membrane electrode assembly 9 to the surface thereof jointed to the fourth membrane electrode assembly 10 and is coupled to the oxygen supply opening 133 of the second double-face separator 13 to supply oxygen into the cell 6c. The fluid discharge opening 144 is coupled to the fluid discharge opening 134 of the second double-face separator 13, and discharges a fluid containing reaction product water produced in the cell 6c.

A hydrogen supply opening 106 penetrating the fourth membrane electrode assembly 10 from the surface of the assembly 10 jointed to the third double-face separator 14 to the surface thereof opposite to this joint surface in order to supply hydrogen into the cell 6d, and a fluid discharge opening 104 for discharging a fluid which is taken in from the hydrogen supply opening 106 and which partially flows through the solid polyelectrolyte membrane 101 in the form of protons are formed in one end portion of the solid polyelectrolyte membrane 101 and gasket 103 of the fourth membrane electrode assembly 10. An oxygen supply opening 107 penetrating the fourth membrane electrode assembly 10 from the surface of the assembly 10 jointed to the third double-face separator 14 to the surface thereof opposite to this joint surface in order to supply oxygen into the cell 6d, and a fluid discharge opening 105 for discharging a fluid containing reaction product water are formed in the other end portion of the solid polyelectrolyte membrane 101 and the gasket 103.

By the third double-face separator 13 being jointed to the fourth membrane electrode assembly 10, a hydrogen circulating section 34d in which hydrogen can circulate is formed likewise the hydrogen circulating section 34b. The hydrogen circulating section 34d, a hydrogen supply relay unit 26d same as the hydrogen supply relay unit 26b, and a fluid discharge relay unit 33d same as the fluid discharge relay unit 33b constitute a hydrogen path 35d. The hydrogen path 35d circulates a fluid containing hydrogen supplied from the hydrogen supply opening in the cell 6d and discharges the fluid from the fluid discharge opening 142.

An oxygen separator 15 for supplying oxygen to the fourth membrane electrode assembly 10 is formed on the side of the cathode 722 of the fourth membrane electrode assembly 10, via the gasket 103 of the fourth membrane electrode assembly 10 that has a rectangular frame shape. The oxygen separator 15 is formed of a material inactive against oxygen, such as ceramic, plastic, glass, silicon, etc., and has a rectangular shape as seen from above likewise the hydrogen separator 11, etc.

A hydrogen supply opening 151 penetrating the oxygen separator 15 from the surface of the separator 15 jointed to the fourth membrane electrode assembly 10 to the surface thereof jointed to the second power collection board 5 in order to circulate hydrogen, and a fluid discharge opening 152 for circulating a fluid flowing out from the hydrogen circulating section 34d, are formed in one end portion of the oxygen separator 15. An oxygen supply opening 153 penetrating the oxygen separator 15 from the surface of the separator 15 jointed to the fourth membrane electrode assembly 10 to the surface thereof jointed to the second power collection board 5 in order to circulate oxygen, and a fluid discharge opening 154 for circulating a fluid containing reaction product water are formed in the other end portion of the oxygen separator 15.

An oxygen conduit 37d same as the oxygen conduit 37a is formed in a switchback shape in the center of the surface of the oxygen separator 15 jointed to the fourth membrane electrode assembly 10. An oxygen supply relay unit 38d for circulating oxygen from the oxygen supply opening 153 into the oxygen conduit 37d likewise the oxygen supply relay unit 38a is formed between one end of the oxygen conduit 37d and the oxygen supply opening 153. An oxygen flow rate sensor 41d is formed in the middle of the oxygen supply relay unit 38d of the oxygen separator 15, likewise the oxygen flow rate sensor 41a of the first double-face separator 12. An oxygen flow meter driver 42d and an oxygen flow meter amp 43d are connected to the oxygen flow rate sensor 41d.

An oxygen small chamber 48 for adjusting the supply amount of oxygen to be supplied into the cell 6d is formed between the other end of the oxygen conduit 37d of the oxygen separator 15 and the fluid discharge opening 154. A fluid discharge relay unit 39d for circulating oxygen and reaction product water from the oxygen conduit 37d via the oxygen small chamber 48 to the fluid discharge opening 154 is formed between the other end of the oxygen conduit 37d and the fluid discharge opening 154.

By the oxygen separator 15 being jointed to the fourth membrane electrode assembly 10, the oxygen conduit 37d constitute an oxygen circulating section 40d in which oxygen and reaction product water can circulate likewise the oxygen circulating section 40a. The oxygen circulating section 40d, the oxygen supply relay unit 38d, and the fluid discharge relay unit 39d constitute an oxygen path 45d. The oxygen path 45d circulates oxygen supplied from the oxygen supply opening and reaction product water in the cell 6d, and discharges them from the fluid discharge opening 154. An oxygen valve 46d is disposed in the oxygen small chamber 48 likewise in the first double-face separator 12. An oxygen valve driver 47d is connected to the oxygen valve 46d.

A conductive thin film made of gold or the like is formed on the surface of the oxygen separator 15 jointed to the fourth membrane electrode assembly 10 and on a part of the side surfaces of the oxygen separator 15.

The second power collection board 5 is jointed to the surface of the oxygen separator 15 opposite to the surface jointed to the fourth membrane electrode assembly 10, via an O-ring 50.

By the power collection boards 4 and 5, the separators 11, 12, 13, 14, and 15, and the membrane electrode assemblies 7, 8, 9, and 10 being screwed together by screws inserted into screw holes 161, the hydrogen supply openings 20, 111, 121, 131, and 141, the fluid discharge openings, 112, 74, 122, 84, 132, 94, 142, 104, 152, and 23, the oxygen supply openings 22, 113, and 123, and the fluid discharge openings 21, 114, 75, 124, 85, 134, 95, 144, 105, and 154 are respectively coupled together in line in the direction of stacking the power collection boards 4 and 5, the separators 11, 12, 13, 14, and 15, and the membrane electrode assemblies 7, 8, 9, and 10.

As a result, as shown in FIG. 1, a hydrogen supply manifold 51 that goes from the hydrogen entry port 16 to the oxygen separator 15 to supply hydrogen into the cells 6a, 6b, 6c, and 6d, and a fluid discharge manifold 52 that goes from the hydrogen separator 11 to the fluid exit port 17 to discharge a fluid flowing out from the hydrogen circulating section 34a, etc. from the fluid exit port 17 are formed in one side of the cell stack unit 2. An oxygen supply manifold 53 that goes from the oxygen entry port 18 to the hydrogen separator 11 to supply oxygen into the cells 6a, 6b, 6c, and 6d, and a fluid discharge manifold 54 that goes from the oxygen separator 15 to the fluid exit port 19 to discharge a fluid containing reaction product water produced from reaction from the fluid exit port 19 are formed in other side of the cell stack unit 2.

As shown in FIG. 2, the cell 6a are built up of the hydrogen separator 11, the first membrane electrode assembly 7, and the cathode side of the first double-face separator 12. Likewise, the cell 6b is built up of the first double-face separator 12, the second membrane electrode assembly 8, and the cathode side of the second double-face separator 13, the cell 6c is built up of the anode side of the second double-face separator 13, the third membrane electrode assembly 9, and the cathode side of the third double-face separator 14, and the cell 6d is built up of the anode side of the third double-face separator 14, the fourth membrane electrode assembly 10, and the oxygen separator 15.

Further, by the power collection boards 4 and 5, the separators 11, 12, 13, 14, and 15, and the membrane electrode assemblies 7, 8, 9, and 10 being jointed-together, the cells 6a, 6b, 6c, and 6d and the power collection boards 4 and 5 become electrically connected in series via the conductive thin films formed on the surfaces of the separators 11, 12, 13, 14, and 15.

The fuel cell 1 according to the present embodiment comprises a control unit 55. The control unit 55 comprises a CPU (Central Processing Unit), a RAM (Random Access Memory), and a ROM (Read Only Memory) (all not shown), and controls each component constituting the fuel cell 1 by expanding a process program recorded in the ROM in the RAM and the CPU executing the process program.

Particularly, in the fuel cell 1 according to the present embodiment, the hydrogen flow meter drivers 29a, 29b, 29c, and 29d, the oxygen flow meter drivers 42a, 42b, 42c, and 42d, the hydrogen flow meter amps 31a, 31b, 31c, and 31d, and the oxygen flow meter amps 43a, 43b, 43c, and 43d are connected to the control unit 55. The control unit 55 generates instruction signals for instructing the hydrogen flow meter drivers 29a, 29b, 29c, and 29d and the oxygen flow meter drivers 42a, 42b, 42c, and 42d to output signals as difference in electromotive force detected by the hydrogen flow rate sensors 27a, 27b, 27c, and 27d and the oxygen flow rate sensors 41a, 41b, 41c, and 41d via the hydrogen flow meter amps 31a, 31b, 31c, and 31d and the oxygen flow meter amps 43a, 43b, 43c, and 43d at regular time intervals.

The hydrogen valve drivers 44a, 44b, 44c, and 44d and the oxygen valve drivers 47a, 47b, 47c, and 47d are connected to the control unit 55. The control unit 55 computes the flow rates of hydrogen and oxygen supplied into the cells 6a, 6b, 6c, and 6d and circulating through the paths, based on the output signals output from the hydrogen flow rate sensors 27a, 27b, 27c, and 27d and amplified by the hydrogen flow meter amps 31a, 31b, 31c, and 31d or based on the output signals output from the oxygen flow rate sensors 41a, 41b, 41c, and 41d. The control unit 55 generates instruction signals for instructing any of the hydrogen valve drivers 44a, 44b, 44c, and 44d and any of the oxygen valve drivers 47a, 47b, 47c, and 47d to apply a predetermined voltage to the piezoelectric element 361, etc. of any of the hydrogen valves 36a, 36b, 36c, and 36d, and of any of the oxygen valves 46a, 46b, 46c, and 46d based on the computed flow rates.

To be more specific, according to the present embodiment, a plurality of voltage values that can be applied to the piezoelectric element 361, etc. by the valve drivers 44 and 47 are set beforehand, and the valves 36 and 46 are opened or closed to multiple degrees in accordance with the voltage value applied.

The control unit 55 finds the largest and smallest values among the flow rates of hydrogen in the cells 6a, 6b, 6c, and 6d per unit time that have been computed based on the values of the electromotive force detected by the hydrogen flow rate sensors 27. Based on these flow rates, the control unit 55 outputs an instruction signal to any of the hydrogen valve drivers 44a to 44d connected to any corresponding one of the hydrogen valves 36a to 36d that is disposed in any corresponding one of the cells 6a, 6b, 6c, and 6d in which the flow rate per unit time is the largest, in order to instruct that hydrogen valve driver 44 to apply a voltage higher by one degree so that any corresponding one of the hydrogen valves 36a to 36d is controlled to be closed further by one degree. In addition, the control unit 55 outputs an instruction signal to any of the hydrogen valve drivers 44a to 44d that is connected to any corresponding one of the hydrogen valves 36a to 36d disposed in any corresponding one of the cells 6a, 6b, 6c, and 6d in which the flow rate per unit time is the smallest to instruct that hydrogen valve driver to apply a voltage lower by one degree to open any corresponding one of the hydrogen valves 36a to 36d further by one degree, so that the supply amounts of hydrogen in the cells 6a, 6b, 6c, and 6d become uniform.

After adjusting the flow rates of hydrogen supplied into the cells 6a, 6b, 6c, and 6d per unit time, the control unit 55 finds the largest and smallest values among the flow rates of oxygen in the cells 6a, 6b, 6c, and 6d per unit time that have been computed based on the values of electromotive force detected by the oxygen flow rate sensors 41. Continuously, the control unit 55 outputs an instruction signal to the oxygen valve driver 47 connected to the oxygen valve 46 that is disposed in the cell 6 in which the flow rate per unit time is the largest to instruct that oxygen valve driver 47 to apply a voltage higher by one degree in order to control the corresponding oxygen valve 46 to be closed further by one degree, and outputs an instruction signal to the oxygen valve driver 47 connected to the oxygen valve 46 disposed in the cell 6 in which the flow rate per unit time is the smallest to instruct that oxygen valve driver 47 to apply a voltage lower by one degree in order to control the corresponding oxygen valve 46 to be opened further by one degree. In this manner, the control unit 55 controls the supply amounts of oxygen in the cells 6a, 6b, 6c, and 6d to become uniform.

In a case where there is any hydrogen valve 36 or oxygen valve 46 that is opened to the full degree because of a voltage not being applied to the piezoelectric element 361, etc. thereof as a result of the flow rates per unit time of hydrogen or oxygen supplied in the cells 6a, 6b, 6c, and 6d having been adjusted, the control unit 55 sends an instruction signal to the flow meter driver 29 or 42 that is connected to the flow rate sensor 27 or 41 disposed in the hydrogen path 35 or oxygen path 45 in which the valve 36 or 46 opened to the full degree is disposed, in order to instruct that flow meter driver 29 or 42 to drive the corresponding flow rate sensor 27 or 41 to output the electromotive force difference. Then, the control unit 55 computes the flow rate of hydrogen or oxygen per unit time that was required for the electromotive force based on the electromotive force difference output from the flow rate sensor 27 or 41 and amplified by the flow meter amp 31 or 43. In a case where the computed flow rate per unit time is smaller than a predetermined value, the control unit 55 outputs instruction signals to the hydrogen valve drivers 44 or the oxygen valve drivers 47 that are connected to the hydrogen valves 36 or the oxygen valves 46 other than the hydrogen valve 36 or the oxygen valve 46 opened to the full degree, in order to instruct those hydrogen valve drivers 44 or oxygen valve drivers 47 to apply a voltage by which the hydrogen valves 36 or the oxygen valves 46 other than the hydrogen valve 36 or the oxygen valve 46 opened to the full degree will be closed to the full degree.

Next, the working mechanism according to the present embodiment will be explained.

For power generation, the fuel cell 1 is supplied with a fluid containing hydrogen from the hydrogen entry port 16, and the supplied fluid containing hydrogen flows into the hydrogen supply manifold 51. The fluid containing hydrogen flowing into the hydrogen supply manifold 51 flows into the hydrogen path 35 that is coupled to the hydrogen supply manifold 51 in each cell 6. Simultaneously, a fluid containing oxygen is supplied from the oxygen entry port 18. The supplied fluid containing oxygen flows into the oxygen supply manifold 53, and further flows into the oxygen path 45 coupled to the oxygen supply manifold 53 in each cell 6.

In each cell 6, the hydrogen in the fluid flowing into the hydrogen path 35 circulates in the hydrogen circulating section 34, contacts the anode 721, etc. and thereby becomes dissociated into protons and electrons. The electrons are output to an external circuit by the power collection boards via the conductive thin films formed on the separators 11, 12, 13, 14, and 15, while the protons permeate the solid polyelectrolyte membranes 71, etc. to reach the side of the cathode 722, etc. The oxygen in the fluid flowing into the oxygen path 45 circulates in the oxygen circulating section 40, contacts the cathode 722, etc., and reacts with the hydrogen protons coming from the side of the anode 721, etc., thereby producing reaction product water.

In generating power, the fuel cell 1 according to the present embodiment adjusts the supply amounts of hydrogen and oxygen to be supplied to each cell 6, and eliminates clogging of the fluid supplied in the paths 35 and 45 in each cell 6c in a case where such a fluid clogging is caused due to water which is contained in the fluid containing hydrogen or due to reaction product water, etc. The processes of adjusting the supply amounts of hydrogen and oxygen and eliminating clogging of the paths 35 and 45 will be explained below with reference to FIG. 7.

Figure 7:
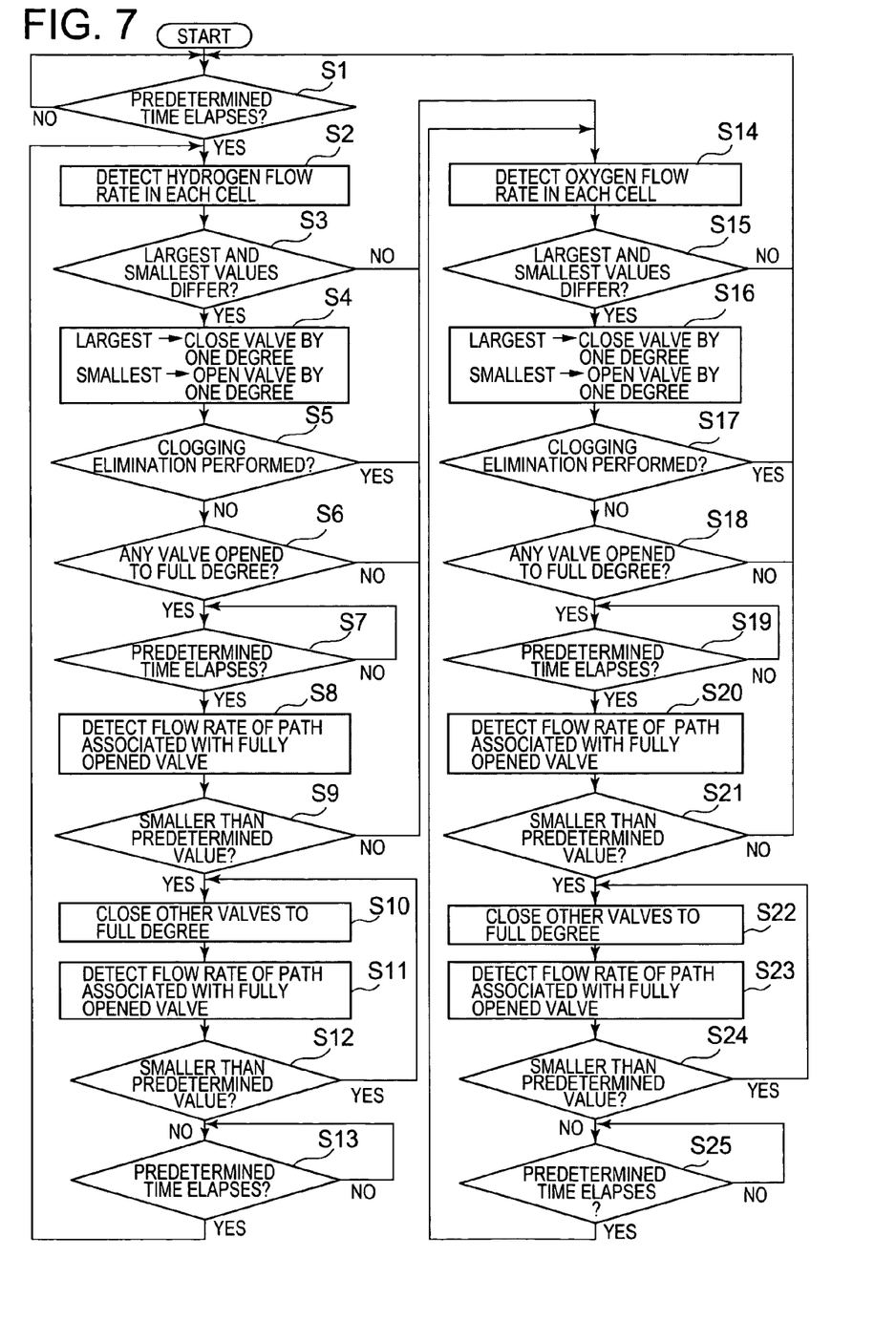
FIG. 7 is a flowchart of processes for adjusting the supply amounts of hydrogen and oxygen and eliminating clogging of a path in the fuel cell according to the present embodiment.

When a predetermined time elapses (S1=Yes), the control unit 55 sends an instruction signal to each hydrogen flow meter driver 29 to instruct it to drive each hydrogen flow rate sensor 27 to output a signal as an electromotive force difference. Based on the electromotive force difference output in accordance with the instruction and amplified by each hydrogen flow meter amp 31, the control unit 55 computes the flow rate per unit time of hydrogen circulating through the hydrogen path 35 in each cell 6 (S2).

The control unit 55 determines whether the largest value and smallest value of the computed flow rates per unit time of the cells 6 differ from each other (S3). In a case where they differ from each other (S3=Yes), the control unit 55 sends an instruction signal to the hydrogen valve driver 44 that is connected to the hydrogen valve 36 disposed in the cell 6 in which the flow rate per unit time is the largest, to instruct it to apply a voltage higher by one degree. In response to this instruction signal, the hydrogen valve driver 44 is activated to close the corresponding hydrogen valve 36 by one degree. Also, the control unit 55 sends an instruction signal to the hydrogen valve driver 44 that is connected to the hydrogen valve 36 disposed in the cell 6 in which the flow rate per unit time is the smallest, in order to instruct it to apply a voltage lower by one degree. As a result, the hydrogen valve driver 44 is activated to open the corresponding hydrogen valve 36 by one degree (S4). In a case where the largest and smallest values of the flow rates do not differ from each other (S3=No), the process flow goes to step S14.

Next, the control unit 5 determines whether the process for eliminating clogging of the hydrogen path 35 (steps S6 to S13 to be described later) has already been performed or not (S5). In a case where the eliminating process has not been performed (S5=No), the control unit 55 determines whether an instruction signal for instructing any hydrogen valve 36 to be opened to the full degree was sent to any hydrogen valve driver 44 at the time the opening or closing degrees of the hydrogen valves 36 were adjusted (S6). In a case where such an instruction signal was sent and any hydrogen valve 36 is opened to the full degree (S6=Yes), and after a predetermined time elapses (S7=Yes), the control unit 55 controls the hydrogen flow rate sensor 27 disposed in the hydrogen path 35 in which the hydrogen valve 36 opened to the full degree is disposed, to output an electromotive force difference, and computes the flow rate of hydrogen flowing in the hydrogen path 35 per unit time (S8).

The control unit 55 determines whether the computed flow rate per unit time is smaller than a predetermined value which is set as a flow rate per unit time of the case where the valve is opened to the full degree with no clogging (S9). In a case where the flow rate is smaller than the predetermined value (S9=Yes), the control unit 55 determines that the hydrogen path 35 is clogged, and controls all the other valves 36 than the hydrogen valve 36 disposed in this hydrogen path 35 to be closed to the full degree (S10). This causes the fluid containing hydrogen from the hydrogen supply manifold 51 to be supplied to only the cell 6 in which the hydrogen valve 36 opened to the full degree is disposed. As a result, the pressure and flow velocity in the hydrogen path 35 rise, and the cause of the clogging of the hydrogen path 35 is eliminated through the fluid discharge manifold 52.

After a predetermined time has elapsed, the control unit 55 again controls the hydrogen flow rate sensor 27 disposed in the hydrogen path 35 in which the hydrogen valve 36 opened to the full degree is disposed to output an electromotive force difference, and computes (S11) the flow rate per unit time of the hydrogen flowing in the hydrogen path 35. In a case where the computed flow rate per unit time is smaller than the predetermined value (S12=Yes), the control unit 55 repeats the steps from S10. In a case where there are a plurality of clogged hydrogen valves 36, the steps S8 to S12 are performed for each of the hydrogen valves 36 that are opened to the full degree, sequentially valve by valve.

In a case where the computed flow rate is no longer smaller than the predetermined value as a result of the clogging eliminating process having been performed (S12=No), and in a case where the valve opened to the full degree has not yet been opened to the full degree for a predetermined time (S13=No), the control unit 55 keeps the full open state until the predetermined time elapses. When the valve opened to the full degree has been opened to the full degree for the predetermined time (S13=Yes), the control unit 55 performs the steps from S2 again to adjust the supply amount of hydrogen in each cell 6.

On the other hand, in a case where the flow rate of hydrogen per unit time in the hydrogen path 35 in which the hydrogen valve 36 opened to the full degree is disposed is not smaller than the predetermined value without the necessity of performing the clogging eliminating process (S9=No), in a case where there is no valve that is opened to the full degree (S6=No), or after the clogging eliminating process is performed and the supply amount of hydrogen to be supplied to each cell 6 is adjusted again (S5=Yes), the control unit 55 sends an instruction signal to each oxygen flow meter driver 42 to instruct it to drive each oxygen flow rate sensor 41 to output a signal as an electromotive force difference. Based on the electromotive force difference output in response to this instruction and then amplified by the oxygen flow meter amp 43, the control unit 55 computes the flow rate per unit time of oxygen circulating through the oxygen path 45 in each cell 6 (S14).

The control unit 55 determines whether the largest value and smallest value among the computed flow rates per unit time of oxygen in the cells 6 differ from each other (S15). In a case where the largest value and the smallest value differ from each other (S15=Yes), the control unit 55 sends an instruction signal to the oxygen valve driver 47 that is connected to the oxygen valve 46 disposed in the cell 6 in which the flow rate per unit time is the largest, to instruct the driver 47 to apply a voltage higher by one degree. In response to this, the oxygen valve driver 47 is activated and the oxygen valve 46 is closed by one degree. The control unit 55 sends an instruction signal to the oxygen valve driver 47 that is connected to the oxygen valve 46 disposed in the cell 6 in which the flow rate per unit time is the smallest, to instruct the driver 47 to apply a voltage lower by one degree. In accordance with this instruction, the oxygen valve driver 47 is activated and the oxygen valve 46 is opened by one degree (S16). In a case where the largest and smallest values of the flow rates per unit time of oxygen do not differ from each other (S15=No), the control unit 55 returns to step S1 and continues the process.

Next, the control unit 55 determines whether the process for eliminating clogging of the oxygen path 45 (steps S18 to S25 to be described later) has already been performed (S17). In a case where the eliminating process has not been performed (S17=No), the control unit 55 determines whether an instruction signal was sent to any oxygen valve driver 47 so that any oxygen valve 46 would be opened to the full degree, at the time the opening and closing degrees of the oxygen valves 46 were adjusted (S18). In a case where such an instruction signal was sent and any of the oxygen valves 46 is opened to the full degree (S18=Yes), and after a predetermined time elapses (S19=Yes), the control unit 55 sends a signal to the oxygen flow rate sensor 41 in the oxygen path 45 in which the oxygen valve 46 opened to the full degree is disposed, to output an electromotive force difference, and computes the flow rate per unit time of oxygen circulating through that oxygen path 45 (S20).

The control unit 55 determines whether the computed flow rate per unit time is smaller than a predetermined value which is set as a flow rate per unit time of a case where the valve is opened to the full degree with no clogging (S21). In a case where the flow rate is smaller than the predetermined value (S21=Yes), the control unit 55 controls the oxygen valves 46 other than the oxygen valve 46 disposed in the corresponding oxygen path 45 to be closed to the full degree (S22). Due to this, the pressure and flow velocity in this oxygen path 45 rise and therefore the cause of the clogging such as reaction product water in the oxygen path 45 is discharged through the fluid discharge manifold 54.

After a predetermined time elapses, the control unit 55 again controls the oxygen flow rate sensor 41 disposed in the oxygen path 45 in which the oxygen valve 46 opened to the full degree is disposed to output an electromotive force difference, and computes the flow rate per unit time of oxygen circulating through this oxygen path 45 (S23). In a case where the computed flow rate per unit time is smaller than the predetermined value (S24=Yes), the control unit 55 repeats the steps from S22. Steps from S20 to S25 are performed for all the oxygen valves 46 that are opened to the full degree sequentially valve by valve.

In a case where the flow rate of oxygen per unit time becomes not smaller than the predetermined value as a result of the clogging eliminating process having been performed (S24=No), and in a case where the valve opened to the full degree has not been opened to the full degree for a predetermined time (S25=No), the control unit 55 keeps the full opened state until the predetermined time elapses. When the valve opened to the full degree has been opened for the predetermined time (S25=Yes), the control unit 55 performs the steps from S14 again to adjust the supply amount of oxygen in each cell 6.

On the other hand, in a case where the flow rate of oxygen per unit time in the oxygen path 45 in which the oxygen valve 46 opened to the full degree is disposed is not smaller than the predetermined value without the necessity of performing the clogging eliminating process (S21=No), in a case where there is no oxygen valve 46 that is opened to the full degree (S18=No), or after the clogging eliminating process is performed and the supply amount of oxygen to be supplied into each cell 6 is adjusted again (S17=Yes), the control unit 55 repeats the steps after S1. By this process flow, adjustment of the supply amounts of hydrogen and oxygen in each cell 6 and elimination of clogging of the paths 35 and 45 are performed at regular time intervals.

As described above, since the supply amounts of hydrogen and oxygen to be supplied into each cell 6 are adjusted based on the flow rate per unit time of hydrogen and oxygen circulating through the paths 35 and 45 of each cell 6 while eliminating clogging of the paths 35 and 45 if there is any such clogging, hydrogen and oxygen are supplied to each cell 6 uniformly, allowing the power generation performance to be maintained uniform among the cells 6 and enabling the equilibrium suitable for hydrogen and oxygen to react with each other to be maintained. According to the present embodiment, the supply amount of oxygen is adjusted after the supply amount of hydrogen is adjusted. Therefore, the equilibrium suitable for hydrogen and oxygen to react is maintained much better. Further, the valves 36 and 46 are disposed at the downstream of the paths 35 and 45 in each cell 6. Therefore, even if the supply amounts of hydrogen and oxygen are adjusted, the pressures in the paths 35 and 45 are maintained and the uniformly supplied state of hydrogen and oxygen in the paths 35 and 45 is therefore maintained.

The fluid which has contained hydrogen before it circulates in the hydrogen circulating section 34 in each cell 6 goes through the fluid discharge manifold 52 coupled to the hydrogen path 35 after flowing out from the hydrogen circulating section 34, and is discharged from the fluid exit port 17. Oxygen that is left unused while circulating through the oxygen path 45 in each cell 6 and reaction product water produced from reaction with hydrogen go through the fluid discharge manifold 54 coupled to the oxygen path 45 and are discharged from the fluid exit port 19.

According to the above explanation, the fuel cell 1 of the present embodiment maintains the power generation performance uniform among the cells 6 and keeps the equilibrium suitable for hydrogen and oxygen to react, by adjusting the supply amounts of hydrogen and oxygen cell by cell. Therefore, the fuel cell 1 can prevent the power generation efficiency from decreasing.

Particularly, since the valves are disposed at the downstream of the paths 35 and 45, the pressures in the paths 35 and 45 are maintained unchanged when the supply amounts of hydrogen and oxygen are adjusted, allowing the uniformly supplied state of hydrogen and oxygen to be maintained in the paths 35 and 45. This further contributes to preventing decrease of the power generation efficiency.

In a case where air is taken in from the oxygen entry port 18 as oxygen, a more than necessary amount of air taken into the cell 6 would lower the temperature and humidity in the cell 6, thereby deteriorating the power generation performance. Also from this kind of viewpoint, adjusting the supply amount of oxygen to be supplied to the cell 6 can prevent the power generation efficiency from decreasing.

Furthermore, it is also possible to prevent the power generation efficiency from decreasing, by eliminating clogging of the paths 35 and 45 in each cell 6 to maintain the power generation performance uniform among the cells 6.

According to the present embodiment, a plurality of voltage values that can be applied by the valve drivers 44 and 47 are set beforehand, and the valves 36 and 46 are opened or closed to multiple degrees in accordance with the voltage value applied. However, the opening or closing degree of the valve may be controlled in accordance with the duty ratio between the time period for voltage application and the time period for stop of voltage application.

According to the present embodiment, the hydrogen valve 36 is constituted by the piezoelectric element 361 and the opening/closing member 362 made of elastic gum and capable of opening or closing the entry into each of the hydrogen small chambers 32a to 32d of the cells 6a to 6d. However, a valve built up of an MEMS may be used. For example, a valve having a chamber on one end of which a diaphragm is formed and on the other end of which an electrode plate for sandwiching the chamber is formed may be disposed in a manner that the diaphragm is located at the entry into the hydrogen small chambers 32a to 32d of the fluid discharge relay unit 33. With this disposition, the electrostatic force to be generated changes in accordance with the voltage to be applied to the electrode plate to thereby change the interval of the electrode plate, and also the expansivity of the diaphragm changes. In accordance with this mechanism, the opening or closing degree of the entry is changed.

Figure 8:
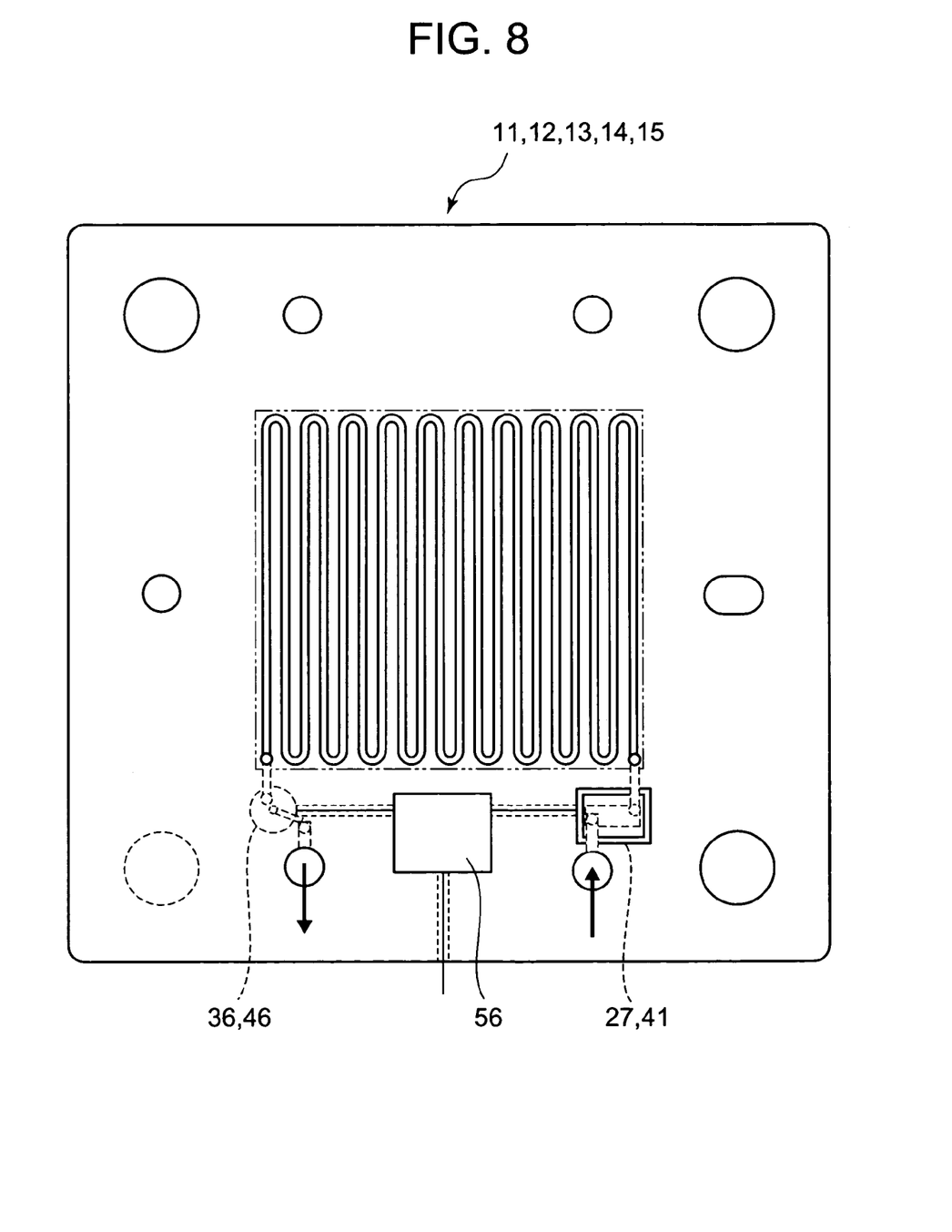
FIG. 8 is a plan view showing a modification example of the separator constituting the fuel cell according to the present embodiment.

According to the present embodiment, the valve drivers 44 and 47 and the flow meter drivers 29 and 42 are provided outside each sell 6. However, these valve drivers 44 and 47 and flow meter drivers 29 and 42 may be formed on one IC chip 56 and disposed on each of the separators 11, 12, 13, 14, and 15 in the neighborhood of the valves 36 and 46 and flow rate sensors 27 and 41 as shown in FIG. 8. With this manner, it becomes possible to change the voltage to be output and the power to be output by increasing or decreasing the number of cells 6 to be stacked, without the necessity of modifying the hardware and software.

According to the present embodiment, a plurality of cells 6 are stacked. The present invention is not limited to this case. The cells 6 may be arranged side by side in parallel.

Furthermore, according to the present embodiment, what has been described is a solid polymer fuel cell. However, the present invention may be applied to a solid oxide fuel cell.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-250488 filed on Aug. 30, 2004 and including specification, claims, drawings and summary. The disclosure of the above Japanese Patent Application is incorporated herein by reference in its entirety.

What is claimed is:

1. A fuel cell comprising:
a plurality of electrolyte membranes;
a first plurality of separators in each of which a fuel path through which a fuel flows is formed so as to face a first surface of a respective one of the plurality of electrolyte membranes;
a fuel supply amount adjuster which is provided at the fuel path in each of the first plurality of separators and which adjusts an amount of the fuel supply;
a fuel flow rate detector which is provided at the fuel path in each of the first plurality of separators and which detects a flow rate per unit time of the fuel path;
a second plurality of separators in each of which an oxidizer path through which an oxidizer flows is formed so as to face a second surface of a respective one of the plurality of electrolyte membranes; and
a plurality of control units which control the fuel supply amount adjuster of each fuel path to adjust the amount of fuel supply in accordance with the flow rate per unit time detected by the fuel flow rate detector of each fuel path;
wherein, when a flow rate per unit time in one of the first plurality of separators is adjusted to a maximum by the fuel supply amount adjuster and the actual flow rate per unit time therein detected by the fuel flow rate detector is lower than a predetermined value, the control unit controls the fuel supply amount adjuster to minimize the flow rate per unit time in others of the first plurality of separators.

2. The fuel cell according to claim 1, wherein the fuel supply amount adjuster of each fuel path comprises a piezoelectric element which changes in shape in accordance with a voltage to be applied, and supplies or blocks a flow of gas by opening/closing the fuel path in accordance with the shape of the piezoelectric element.

3. The fuel cell according to claim 2, wherein each of the first plurality of separators comprises a small chamber provided in each of the fuel paths; and
wherein the fuel supply amount adjuster of each fuel path causes an opening/closing member provided in the piezoelectric element to come into and out of contact with an entry to the small chamber.

4. The fuel cell according to claim 3, wherein the opening/closing member is made of elastic gum.

5. The fuel cell according to claim 1, wherein the fuel supply amount adjuster of each fuel path comprises a pair of electrode plates of which an interval is changed in accordance with a voltage to be applied; and
wherein the flow rate of gas in each fuel path is changed by changing the interval of the pair of electrode plates.

6. The fuel cell according to claim 5, wherein each of the first plurality of separators further comprises a small chamber provided in each of the fuel paths; and
wherein the fuel supply amount adjuster of each fuel path changes an opening/closing degree of an entry to the small chamber by changing a diaphragm sandwiched between the pair of electrode plates.

7. A fuel cell comprising:
a plurality of electrolyte membranes;
a first plurality of separators in each of which a fuel path through which a fuel flows is formed so as to face a first surface of a respective one of the plurality of electrolyte membranes;
a fuel supply amount adjuster which is provided at the fuel path in each of the first plurality of separators and which adjusts an amount of the fuel supply;
a fuel flow rate detector which is provided at the fuel path in each of the first plurality of separators and which detects a flow rate per unit time of the fuel path;
a second plurality of separators in each of which an oxidizer path through which an oxidizer flows is formed so as to face a second surface of a respective one of the plurality of electrolyte membranes; and
a plurality of control units which control the fuel supply amount adjuster of each fuel path to adjust the amount of fuel supply in accordance with the flow rate per unit time detected by the fuel flow rate detector of each fuel path;
wherein, in the first plurality of separators, the fuel supply amount adjuster of each fuel path comprises a piezoelectric element which changes in shape in accordance with a voltage to be applied, and supplies or blocks a flow of gas by opening/closing the fuel path in accordance with the shape of the piezoelectric element; and
wherein, when a flow rate per unit time in one of the first plurality of separators is adjusted to a maximum by the fuel supply amount adjuster and the actual flow rate per unit time therein detected by the fuel flow rate detector is lower than a predetermined value, the control unit controls the fuel supply amount adjuster to minimize the flow rate per unit time in others of the first plurality of separators.

8. The fuel cell according to claim 7, wherein each of the first plurality of separators comprises a small chamber provided in the fuel path; and
wherein the fuel supply amount adjuster of each fuel path causes an opening/closing member provided in the piezoelectric element to come into and out of contact with an entry to the small chamber.

9. The fuel cell according to claim 8, wherein the opening/closing member is made of elastic gum.

10. A fuel cell comprising:
a plurality of electrolyte membranes;
a first plurality of separators in each of which a fuel path through which a fuel flows is formed so as to face a first surface of a respective one of the plurality of electrolyte membranes;
a fuel supply amount adjuster which is provided at the fuel path in each of the first plurality of separators and which adjusts an amount of the fuel supply;
a fuel flow rate detector which is provided at the fuel path in each of the first plurality of separators and which detects a flow rate per unit time of the fuel path;
a second plurality of separators in each of which an oxidizer path through which an oxidizer flows is formed so as to face a second surface of a respective one of the plurality of electrolyte membranes; and
a plurality of control units which control the fuel supply amount adjuster of each fuel path to adjust the amount of fuel supply in accordance with the flow rate per unit time detected by the fuel flow rate detector of each fuel path;
wherein, in the first plurality of separators, the fuel supply amount adjuster of each fuel path comprises a pair of electrode plates of which an interval is changed in accordance with a voltage to be applied, and wherein a flow of gas is supplied or blocked by changing the interval of the pair of electrode plates; and
wherein, when a flow rate per unit time in one of the first plurality of separators is adjusted to a maximum by the fuel supply amount adjuster and the actual flow rate per unit time therein detected by the fuel flow rate detector is lower than a predetermined value, the control unit controls the fuel supply amount adjuster to minimize the flow rate per unit time in others of the first plurality of separators.

11. The fuel cell according to claim 10, wherein each of the first plurality of separators comprises a small chamber provided in the fuel path; and
wherein the fuel supply amount adjuster of each fuel path changes an opening/closing degree of an entry to the small chamber by changing a diaphragm sandwiched between the pair of electrode plates.

12. The fuel cell according to claim 1, wherein each of the first plurality of separators comprises an adjuster driver which drives the fuel supply amount adjuster of each fuel path, and a detector driver which drives the fuel flow rate detector of each fuel path.

13. The fuel cell according to claim 1, wherein the fuel supply amount adjuster of each fuel path is provided downstream of the fuel path.

14. A fuel cell comprising:
a plurality of electrolyte membranes;
a first plurality of separators in each of which a fuel path through which a fuel flows is formed so as to face a first surface of a respective one of the plurality of electrolyte membranes;
a fuel supply amount adjuster which is provided at the fuel path in each of the first plurality of separators and which adjusts an amount of the fuel supply;
a fuel flow rate detector which is provided at the fuel path in each of the first plurality of separators and which detects a flow rate per unit time of the fuel path;
a second plurality of separators in each of which an oxidizer path through which an oxidizer flows is formed so as to face a second surface of a respective one of the plurality of electrolyte membranes;
an oxidizer supply amount adjuster which is provided at the oxidizer path in each of the second plurality of separators and which adjusts an amount of the oxidizer supply;
an oxidizer flow rate detector which is provided at the oxidizer path in each of the second plurality of separators and which detects a flow rate per unit time of the oxidizer path;
a plurality of control units which control the fuel and oxidizer supply amount adjusters to adjust the amount of fuel and oxidizer supply in accordance with the flow rate per unit time detected by the fuel and oxidizer flow rate detectors, respectively;
wherein, when a flow rate per unit time in one of the first plurality of separators is adjusted to a maximum by the fuel supply amount adjuster and the actual flow rate per unit time therein detected by the fuel flow rate detector is lower than a predetermined value, the control unit controls the fuel supply amount adjuster to minimize the flow rate per unit time in others of the first plurality of separators; and
wherein, when a flow rate per unit time in one of the second plurality of separators is adjusted to a maximum by the oxidizer supply amount adjuster and the actual flow rate per unit time therein detected by the oxidizer flow rate detector is lower than a predetermined value, the control unit controls the oxidizer supply amount adjuster to minimize the flow rate per unit time in others of the second plurality of separators.

* * * * *